(12) United States Patent
Burrell et al.

(10) Patent No.: US 7,573,898 B2
(45) Date of Patent: Aug. 11, 2009

(54) METHOD AND APPARATUS TO DOUBLE LAN SERVICE UNIT BANDWIDTH

(75) Inventors: Gary Burrell, Wyckoff, NJ (US); Roy Charles McNeil, Jr., Warwick, NY (US)

(73) Assignee: Fujitsu Limited, Kawasaki (JP)

( * ) Notice: Subject to any disclaimer, the term of this patent is extended or adjusted under 35 U.S.C. 154(b) by 832 days.

(21) Appl. No.: 10/745,561

(22) Filed: Dec. 29, 2003

(65) Prior Publication Data
US 2005/0147121 A1 Jul. 7, 2005

(51) Int. Cl.
*H04L 12/66* (2006.01)

(52) U.S. Cl. .................. 370/463; 370/229; 370/351; 370/401; 370/419; 370/468; 370/901; 370/907

(58) Field of Classification Search .......... 370/229, 370/351, 419, 901, 907, 401, 463, 468
See application file for complete search history.

(56) References Cited

U.S. PATENT DOCUMENTS

| | | | | |
|---|---|---|---|---|
| 5,428,607 A * | 6/1995 | Hiller et al. | ............... | 370/352 |
| 5,485,455 A * | 1/1996 | Dobbins et al. | .............. | 370/255 |
| 5,490,252 A * | 2/1996 | Macera et al. | ............... | 709/249 |
| 5,544,163 A * | 8/1996 | Madonna | .................... | 370/352 |
| 5,615,211 A * | 3/1997 | Santore et al. | .............. | 370/419 |
| 6,108,345 A * | 8/2000 | Zhang | ....................... | 370/445 |
| 6,320,863 B1 * | 11/2001 | Ramfelt | ...................... | 370/404 |
| 6,330,221 B1 * | 12/2001 | Gomez | ....................... | 370/217 |
| 6,359,859 B1 * | 3/2002 | Brolin et al. | ................ | 370/218 |
| 6,539,027 B1 * | 3/2003 | Cambron | .................... | 370/442 |
| 6,597,684 B1 * | 7/2003 | Gulati et al. | ................ | 370/351 |
| 6,631,134 B1 * | 10/2003 | Zadikian et al. | ......... | 370/395.21 |
| 6,766,381 B1 * | 7/2004 | Calvignac et al. | ........... | 709/246 |
| 6,834,049 B1 * | 12/2004 | Tomar et al. | ................ | 370/369 |
| 6,956,847 B2 * | 10/2005 | Heston et al. | ............... | 370/353 |
| 6,963,941 B1 * | 11/2005 | Lee | ............................ | 710/107 |
| 7,218,640 B2 * | 5/2007 | Lebizay et al. | .............. | 370/429 |
| 2001/0010694 A1 * | 8/2001 | Lindsey et al. | .............. | 370/405 |
| 2002/0097713 A1 * | 7/2002 | Chang et al. | ................ | 370/369 |
| 2002/0131436 A1 * | 9/2002 | Suri | .......................... | 370/419 |
| 2002/0194291 A1 * | 12/2002 | Najam et al. | ................ | 709/213 |
| 2003/0123645 A1 * | 7/2003 | Comisky | ............... | 379/399.01 |
| 2003/0191883 A1 * | 10/2003 | April | .......................... | 710/305 |
| 2003/0231624 A1 * | 12/2003 | Alappat et al. | .............. | 370/360 |
| 2004/0076365 A1 * | 4/2004 | Ramaswami et al. | .......... | 385/16 |

(Continued)

*Primary Examiner*—Ricky Ngo
*Assistant Examiner*—Luat Phung
(74) *Attorney, Agent, or Firm*—Hanify & King, P.C.

(57) ABSTRACT

A LAN Service Unit (LANSU) backplane extender provides an inexpensive way to increase LANSU backplane bandwidth so that the performance degradation that may otherwise result can be avoided. A system having increased LANSU bandwidth comprises a backplane including a plurality of data traffic communications connections operable to communicate data traffic, a Line Unit including a WAN interface and a data traffic communications interface to the data traffic communications connections, a LANSU including a LAN interface, a data traffic communications interface to a Bandwidth Extender, and a data traffic communications interface to the data traffic communications connections, and the Bandwidth Extender including a data traffic communications interface to the LANSU and a data traffic communications interface to the data traffic communications connections, the Bandwidth Extender operable to communicate data traffic between the data traffic communications interface to the LANSU and the data traffic communications interface to the data traffic communications connections.

6 Claims, 3 Drawing Sheets

U.S. PATENT DOCUMENTS

| | | | |
|---|---|---|---|
| 2005/0010958 A1* | 1/2005 | Rakib et al. | 725/111 |
| 2005/0041684 A1* | 2/2005 | Reynolds et al. | 370/463 |
| 2005/0089027 A1* | 4/2005 | Colton | 370/380 |
| 2005/0100340 A1* | 5/2005 | Nishimura | 398/135 |
| 2005/0141551 A1* | 6/2005 | McNeil et al. | 370/466 |
| 2005/0147121 A1* | 7/2005 | Burrell et al. | 370/468 |
| 2005/0238018 A1* | 10/2005 | Devi et al. | 370/389 |
| 2005/0259571 A1* | 11/2005 | Battou | 370/217 |
| 2008/0137530 A1* | 6/2008 | Fallis et al. | 370/216 |

* cited by examiner

METHOD AND APPARATUS TO DOUBLE LAN SERVICE UNIT BANDWIDTH

FIELD OF THE INVENTION

The present invention relates to a bandwidth extender for a LAN Service Unit that increases LAN Service Unit backplane bandwidth.

BACKGROUND OF THE INVENTION

Synchronous optical network (SONET) is a standard for optical telecommunications that provides the transport infrastructure for worldwide telecommunications. SONET offers cost-effective transport both in the access area and core of the network. For instance, telephone or data switches rely on SONET transport for interconnection.

In a typical application, a local area network (LAN), such as Ethernet, is connected to a wide area network (WAN), such as that provided by SONET. The LAN and WAN may be interfaced by a device known as a LAN Service Unit (LANSU), which has ports for connecting the LAN and ports for connecting the WAN. In many applications, the LAN input bandwidth to the LANSU may be greater than the LANSU backplane bandwidth or the WAN bandwidth that the system has to offer. If the traffic on the LAN requires greater bandwidth than the LANSU backplane or WAN can provide, traffic may be lost and serious degradation of performance may result. Proliferation of ever faster LAN technologies makes this situation even more likely. A need arises for a technique by which LANSU backplane bandwidth can be increased to handle increased LAN traffic bandwidth that is inexpensive and that avoids the performance degradation that may otherwise result.

SUMMARY OF THE INVENTION

The present invention is a LANSU backplane extender card that provides an inexpensive way to increase LANSU backplane bandwidth so that the performance degradation that may otherwise result can be avoided.

The invention involves a system having multiple cards which communicate across a backplane using BW limited point to point links (communications channels). In the case where two cards A and B have more traffic than can be carried from A to B over the existing communications channel and a communications channel exists from A to C and from C to B, C can be used as a Bandwidth extender by allowing its bandwidth to be used in parallel with A's bandwidth to create a wider communication channel to B.

In one instance the invention is implemented in a system having a dual star architecture. The system has a LANSU communicating to both a working and protect Line Unit (LU). The system has a communication channel from the LANSU to the adjacent slot.

A bandwidth extender is installed in the adjacent slot which enables an additional communications channel from the LANSU to both the working and protect LU.

In one embodiment of the present invention, a system having increased LAN Service Unit bandwidth comprises a backplane including a plurality of data traffic communications connections operable to communicate data traffic, a Line Unit including a WAN interface and a data traffic communications interface to the data traffic communications connections, the Line Unit operable to communicate data traffic between the WAN interface and the data traffic communications interface, a LAN Service Unit including a LAN interface, a data traffic communications interface to a Bandwidth Extender, and a data traffic communications interface to the data traffic communications connections, the LAN Service Unit operable to communicate data between the LAN interface and the data traffic communications interface to the Bandwidth Extender and to communicate data between the LAN interface and the data traffic communications interface to the data traffic communications connections and the Bandwidth Extender including a data traffic communications interface to the LAN Service Unit and a data traffic communications interface to the data traffic communications connections, the Bandwidth Extender operable to communicate data traffic between the data traffic communications interface to the LAN Service Unit and the data traffic communications interface to the data traffic communications connections.

In one aspect of the present invention, the LAN Service Unit is further operable to receive data on the LAN interface, split the received data into two data streams, and transmit the data over the data traffic communications interface to the Bandwidth Extender and the data traffic communications interface to the data traffic communications connections. The LAN Service Unit may be further operable to receive data in two data streams, one data stream received over the data traffic communications interface to the Bandwidth Extender and one data stream received over the data traffic communications interface to the data traffic communications connections, to reassemble the two received data streams into traffic data, and to transmit the reassembled traffic data over the LAN interface. The LAN Service Unit may be further operable to split the data received over the LAN interface into a plurality of data streams using Virtual Concatenation, and wherein the LAN Service Unit is operable to reassemble the plurality of virtually concatenated data streams received over the data traffic communications interface to the Bandwidth Extender and over the data traffic communications interface to the data traffic communications connections.+

The LAN Service Unit may be further operable to split the data received over the LAN interface into a plurality of data streams using Link Aggregation techniques, wherein LAN data is separated based on individual conversations defined by some or all of MAC Source Address (SA), MAC Destination Address (DA), IP SA, IP DA and other higher OSI layer identifiers. The LAN Service Unit is further operable to reassemble the plurality of Link Aggregation data streams received over the data traffic communications interface to the Bandwidth Extender and over the data traffic communications interface to the data traffic communications connections.

In one aspect of the present invention, the LAN interface supports Ethernet and the WAN interface supports Synchronous Optical Network or Synchronous Digital Hierarchy.

In one embodiment of the present invention, apparatus for increasing LAN Service Unit bandwidth comprises a Bandwidth Extender including a data traffic communications interface to a LAN Service Unit and a data traffic communications interface to backplane data traffic communications connections, the Bandwidth Extender operable to communicate data traffic between the data traffic communications interface to the LAN Service Unit and the data traffic communications interface to the data traffic communications connections.

In one aspect of the present invention, the data traffic communications interface to a LAN Service Unit is operable to communicate data with the LAN Service Unit. The data traffic communications interface to the backplane data traffic communications connections may be operable to communicate data with a Line Unit having a WAN interface. Data traffic received from the LAN Service Unit may comprise one of a plurality of data streams formed by the LAN Service Unit by splitting data received over a LAN interface into two data streams. Data traffic transmitted to the LAN Service Unit may comprise one of a plurality of data streams that are reassembled at the LAN Service Unit to form traffic data and transmitted over the LAN interface. The data traffic received from the LAN Service Unit may be split using Virtual Concatenation or Link Aggregation, and wherein data traffic transmitted to the LAN Service Unit is reassembled using Virtual Concatenation or Link Aggregation.

In one aspect of the present invention, the LAN interface of the LAN Service Unit supports Ethernet and the WAN interface of the Line Unit supports Synchronous Optical Network or Synchronous Digital Hierarchy.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A Bandwidth Extender card is plugged into a slot adjacent to a LAN Service Unit and uses the combined bandwidth of the two slots to provide the doubled bandwidth. Unused I/O lines are used to connect the two units together across the backplane. These lines are capable of running Low-voltage differential signaling (LVDS) signals at 622 Mbps or 155 Mbps. The BW Extender card receives LVDS signals from the Line Unit (as do all service unit slots) and relays these signals to the adjacent LAN Service Unit, effectively doubling the bandwidth available for LAN traffic. The Virtual Concatenation standard is used to take the STS channels (STS-1 or STS-3c) from the Line Unit interfaces to each of the two service unit slots and combines these channels to create a larger effective channel over which LAN traffic can be carried in a SONET encapsulated format. In a similar manner, Link Aggregation techniques can be used to separate customer traffic into unique conversations that can be carried over individual STS channels (STS-1 or STS-3c) from the Line Unit interfaces to each of the two service unit slots, also creating a larger effective channel over which LAN traffic can be carried in a SONET encapsulated format. As an example, this method is the only way to achieve line rate traffic for GigE interfaces, where the backplane operates at 622 Mbps to each service unit slot.

Figure 1:
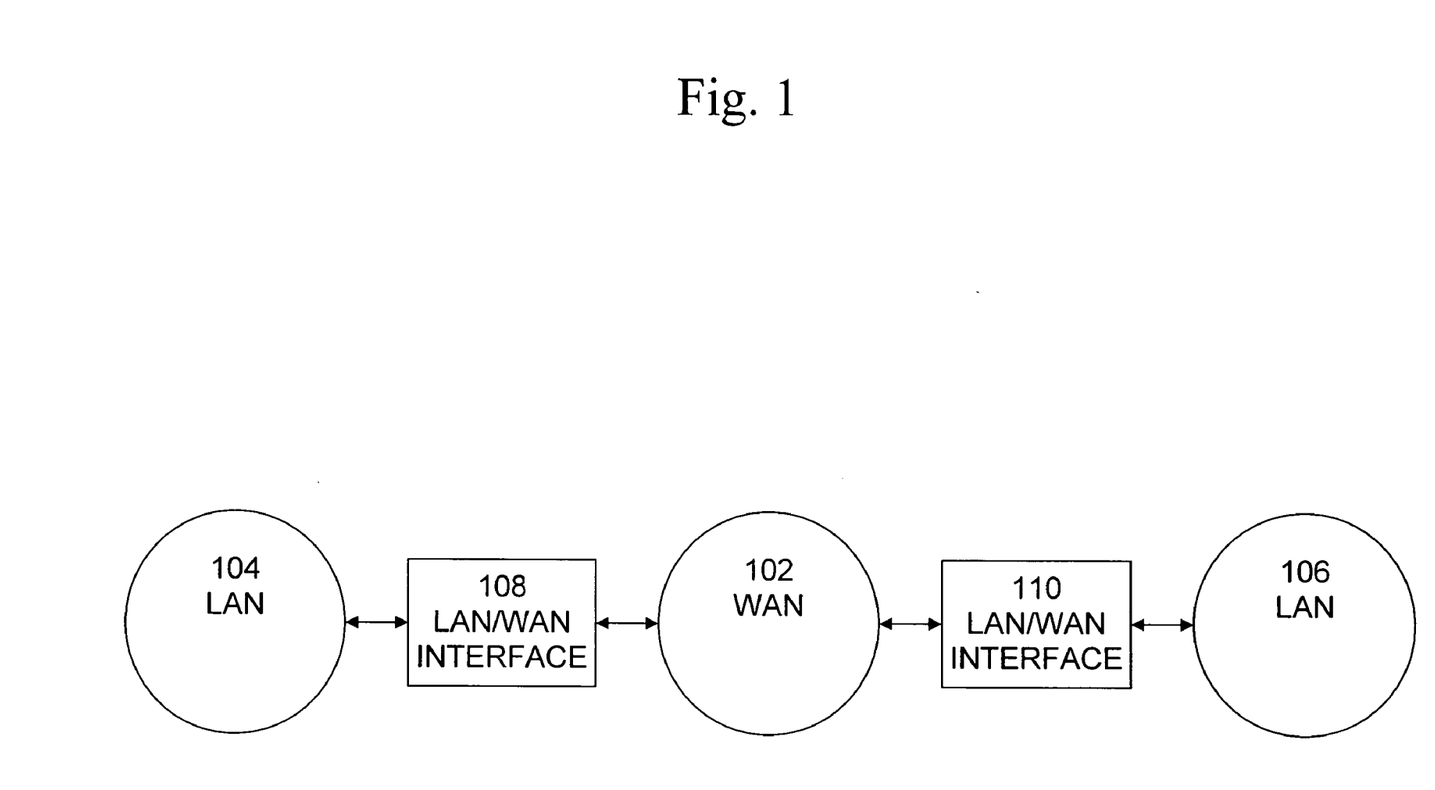
FIG. 1 is an exemplary block diagram of a system in which the present invention may be implemented.

An exemplary block diagram of a system 100 in which the present invention may be implemented is shown in FIG. 1. System 100 includes a Wide Area Network 102 (WAN), one or more Local Area Networks 104 and 106 (LAN), and one or more LAN/WAN interfaces 108 and 110. A LAN, such as LANs 104 and 106, is computer network that spans a relatively small area. Most LANs connect workstations and personal computers. Each node (individual computer) in a LAN has its own CPU with which it executes programs, but it also is able to access data and devices anywhere on the LAN. This means that many users can share expensive devices, such as laser printers, as well as data. Users can also use the LAN to communicate with each other, by sending e-mail or engaging in chat sessions.

There are many different types of LANs, Ethernets being the most common for Personal Computers (PCs). Most Apple Macintosh networks are based on Apple's AppleTalk network system, which is built into Macintosh computers.

Most LANs are confined to a single building or group of buildings. However, one LAN can be connected to other LANs over any distance via longer distance transmission technologies, such as those included in WAN 102. A WAN is a computer network that spans a relatively large geographical area. Typically, a WAN includes two or more local-area networks (LANs), as shown in FIG. 1. Computers connected to a wide-area network are often connected through public networks, such as the telephone system. They can also be connected through leased lines or satellites. The largest WAN in existence is the Internet.

Among the technologies that may be used to implement WAN 102 are optical technologies, such as Synchronous Optical Network (SONET) and Synchronous Digital Hierarchy (SDH). SONET is a standard for connecting fiber-optic transmission systems. SONET was proposed by Bellcore in the middle 1980s and is now an ANSI standard. The standard defines a hierarchy of interface rates that allow data streams at different rates to be multiplexed. With the implementation of SONET, communication carriers throughout the world can interconnect their existing digital carrier and fiber optic systems.

SDH is the international equivalent of SONET and was standardized by the International Telecommunications Union (ITU). SDH is an international standard for synchronous data transmission over fiber optic cables.

In this document, a number of embodiments of the present invention are described as incorporating SONET. Although, for convenience, only SONET embodiments are explicitly described, one of skill in the art would recognize that all such embodiments may incorporate SDH and would understand how to incorporate SDH in such embodiments. Therefore, wherever SONET is used in this document, the use of either SONET or SDH is intended and the present invention is to be understood to encompass both SONET and SDH.

LAN/WAN interfaces 108 and 110 provide electrical, optical, logical, and format conversions to signals and data that are transmitted between a LAN, such as LANs 104 and 106, and WAN 102.

Figure 2:
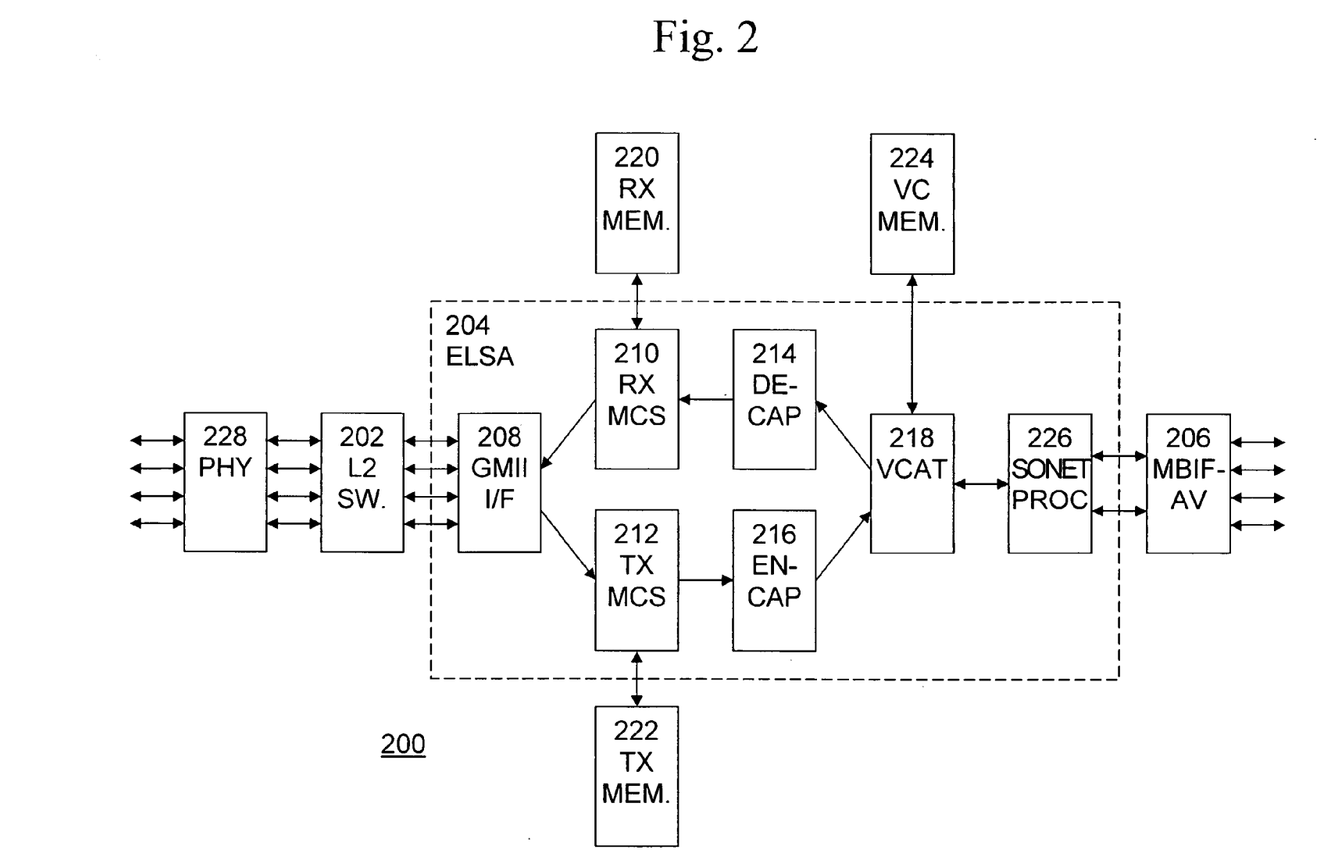
FIG. 2 is an exemplary block diagram of an optical LAN/WAN interface service unit included in the system shown in FIG. 1

An exemplary block diagram of an optical LAN/WAN interface service unit 200 (LANSU) is shown in FIG. 2. A typical LANSU interfaces Ethernet to a SONET or SDH network. For example, a Gig/100BaseT Ethernet LANSU may provide Ethernet over SONET (EOS) services for up to 4 Gigabit Ethernet ports, (4—10/100 BaseT ports in the 100BaseT case). Each port may be mapped to a set of STS-1, STS-3c or STS-12c channels depending on bandwidth requirements. Up to 12—STS-1, 4—STS-3c or 1—STS-12c may be supported up to a maximum of STS-12 bandwidth (STS-3 with OC3 and OC12 LUs).

In addition to EOS functions, LANSU 200 may support frame encapsulation, such as GFP, X.86 and PPP in HDLC Framing. High Order Virtual Concatenation or Link Aggregation may be supported for up to 24—STS-1 or 8—STS-3c channels and is required to perform full wire speed operation on LANSU 200, when operating at 1 Gbps.

LANSU 200 includes three main functional blocks: Layer 2 Switch 202, ELSA 204 and MBIF-AV 206. ELSA 202 is further subdivided into functional blocks including a GMII interface 208 to Layer 2 (L2) Switch 202, receive Memory Control & Scheduler (MCS) 210 and transmit MCS 212, encapsulation 214 and decapsulation 216 functions (for GFP, X.86 and PPP), Virtual Concatenation 218, frame buffering provides by memories 220, 222, and 224, and SONET mapping and performance monitoring functions 226. MBIF-AV 206 is used primarily as a backplane interface device to allow 155 Mbps or 622 Mbps operation. In addition LANSU 200 includes physical interface (PHY) 228.

PHY 228 provides the termination of each of the four physical Ethernet interfaces and performs clock and data recovery, data encode/decode, and baseline wander correction for the 10/100BaseT copper or 1000Base LX or SX optical. Autonegotiation is supported as follows:

10/100BaseT—speed, duplexity, PAUSE Capability
1 GigE—PAUSE Capability

PHY 228 block provides a standard GMII interface to the MAC function, which is located in L2 Switch 202.

L2 Switch 202, for purposes of transparent LAN services, is operated as a MAC device. L2 Switch 202 is placed in port mirroring mode to provide transparency to all types of Ethernet frames (except PAUSE, which is terminated by the MAC). L2 Switch 202 is broken up into four separate 2 port bi-directional MAC devices, which perform MAC level termination and statistics gathering for each set of ports. Support for Ethernet and Ether-like MIBs is provided by counters within the MAC portion of L2 Switch 202. L2 Switch 202 also provides limited buffering of frames in each direction (L2 Switch 202->ELSA 204 and ELSA 204->L2 Switch 202); however, the main packet storage area is the Tx Memory 222 and Rx Memory 220 attached to ELSA 204. L2 Switch 202 is capable of buffering 64 to 9216 byte frames in its limited memory. Both sides of L2 Switch 202 interface to adjacent blocks via a GMII interface.

ELSA 204 provides frame buffering, SONET Encapsulation and SONET processing functions.

In the Tx direction, the GMII interface 208 of ELSA 204 mimics PHY 228 operation at the physical layer. Small FIFOs are incorporated into GMII interface 208 to adapt data flow to the bursty Tx Memory 222 interface. Enough bandwidth is available through the GMII 208 and Tx Memory 222 interfaces (8 Gbps) to support all data transfers without frame drop for all four interfaces (especially when all four Ethernet ports are operating at 1 Gbps). The GMII interface 208 also supports the capability of flow controlling the L2 Switch 202. The GMII block 208 receives memory threshold information supplied to it from the Tx Memory Controller 212, which monitors the capacity of the Tx Memory 222 on a per port basis, and is programmable to drop incoming frames or provide PAUSE frames to the L2 Switch 202 when a predetermined threshold has been reached in memory. When flow control is used, memory thresholds are set such that no frames will be dropped. The GMII interface 208 must also calculate and add frame length information to the packet. This information is used for GFP frame encapsulation.

The Tx MCS 212 provides the low level interface functions to the Tx Memory 222, as well as providing scheduler functions to control pulling data from the GMII FIFOs and paying out data to the Encapsulation block 216.

The primary function of the Tx Memory 222 is to provide a level of burst tolerance to entering LAN data, especially in the case where the LAN bandwidth is much greater than the provisioned WAN bandwidth. A secondary function of this memory is for Jumbo frame storage; this allows cut through operation in the GMII block 208 to provide for lower latency data delivery by not buffering entire large frames. Fixed memory sizes are chosen for each partition regardless of the number of ports or customers currently in operation. Partitioning in this fashion prevents dynamic re-sizing of memory when adding or deleting ports/customers and provides for hitless upgrades/downgrades. The memory is also sized independently of WAN bandwidth. This provides for a constant burst tolerance as specified from the LAN side (assuming zero drain rate on WAN side). This partitioning method also guarantees fair allocation of memory amongst customers.

The Encapsulation block 216 has a demand based interface to the Tx MCS 212. Encapsulation block 216 provides three types of SONET encapsulation modes, provisionable on a per port/customer basis (although SW may limit encapsulation choice on a per board basis). The encapsulation modes are:

PPP in HDLC framing
X.86
GFP (frame mode only)

In each encapsulation mode, additional overhead is added to the pseudo-Ethernet frame format stored in the Tx Memory 222.

The Encapsulation block 216 will decide which of the fields are relevant for the provisioned encapsulation mode. For example, Ethernet Frame Check Sequence (FCS) may or may not be used in Point-to-Point (PPP) encapsulation; and, length information is used only in GFP encapsulation. Another function of the Encapsulation block is to provide "Escape" characters to data that appears as High Level Data Link Control (HDLC) frame delineators (7Es) or HDLC Escape characters (7Ds). Character escaping is necessary in PPP and X.86 encapsulation modes. In the worst case, character escaping can nearly double the size of an incoming Ethernet frame; as such, mapping frames from the Tx Memory 222 to the SONET section of the ELSA 204 is non-deterministic in these encapsulation modes and requires a demand based access to the Tx Memory 222. An additional memory buffer block is housed in the Encapsulation block 216 to account for this rate adaptation issue. Watermarks are provided to the Tx MCS 212 to monitor when the scheduler is required to populate each port/customer space in the smaller memory buffer block.

The Virtual Concatenation (VCAT) block 218 takes the encapsulated frames and maps them to a set of pre-determined VCAT channels. A VCAT channel can consist of the following permutations:

Single STS-1
Single STS-3c
STS-1-Xv (X=1 . . . 24)
STS-3c-Xv (X=1 . . . 8)

These channel permutations provide a wide variety of bandwidth options to a customer and can be sized independently for each VCAT channel. The VCAT block 218 encodes the H4 overhead bytes required for proper operation of Virtual Concatenation. VCAT channel composition is signaled to a receive side LANSU using the H4 byte signaling format specified in the Virtual Concatenation standard. The VCAT block 218 provides TDM data to the SONET processing block after the H4 data has been added.

The SONET Processing block 226 multiplexes the TDM data from the VCAT block 218 into two STS-12 SONET data streams. Proper SONET overhead bytes are added to the data stream for frame delineation, pointer processing, error checking and signaling. The SONET Processing block 226 interfaces to the MBIF-AV block 206 through two STS-12 interfaces. In STS-3 mode (155 Mbps backplane interface), STS-3 data is replicated four times in the STS-12 data stream sent to the MBIF-AV 206; the first of four STS-3 bytes in the multiplexed STS-12 data stream represents the STS-3 data that is selected by the MBIF-AV 206 for transmission.

The MBIF-AV block 206 receives the two STS-12 interfaces previously described and maps them to the appropriate backplane interface LVDS pair (standard slot interface or BW Extender interface). The MBIF-AV 206 also has the responsibility of syncing SONET data to the Frame Pulse provided by the Line Unit and insuring that the digital delay of data from the frame pulse to the Line Unit is within specification. The MBIF-AV 206 block also provides the capability of mapping SONET data to a 155 Mbps or 622 Mbps LVDS interface; this allows LANSU 200 to interface to the OC3LU, OC12LU or OC48LU. 155 Mbps or 622 Mbps operation is provisionable and is upgradeable in system with a corresponding traffic hit. When operating as a 155 Mbps backplane interface, the MBIF-AV 206 must select STS-3 data out of the STS-12 stream supplied by the SONET Processing block and format that for transmission over the 155 Mbps LVDS links.

In the WAN-to-LAN datapath, MBIF-AV 206 is responsible for Clock and Data Recovery (CDR) for the four LVDS pairs, at either 155 Mbps or 622 Mbps.

The MBIF-AV 206 also contains a full SONET framing function; however, for the most part, the framing function serves as an elastic store element for clock domain transfer that is performed in this block. SONET Processing that is performed in this block is as follows:

- A1, A2 alignment (provides pseudo-frame pulse to SONET Processing block to indicate start of frame)
- B1 error monitoring (indicates any backplane errors that may have occurred)

Additional SONET processing is provided in the SONET Processing block 226. Multiplexing of Working/Protect channels from the standard slot interface or Bandwidth Extender slot interface is also provided in the MBIF-AV block 206. Working and Protect selection is chosen under MCU control. After the proper working/protect channels have been selected, the MBIF-AV block 206 transfers data to the SONET Processing block through one or both STS-12 interfaces. When operating at 155 Mbps, the MBIF-AV 206 has the added responsibility of multiplexing STS-3 data into an STS-12 data stream which is supplied to the SONET Processing block 226.

On the receive side, the SONET Processing block 226 is responsible for the following SONET processing:

Path Pointer Processing
Path Performance Monitoring
RDI, REI processing
Path Trace storage In STS-3 mode of operation (155 Mbps backplane interface), a single stream of STS-3 data must be plucked from the STS-12 data stream as it enters the SONET Processing block 226. The SONET Processing block 226 selects the first of the four interleaved STS-3 bytes to reconstruct the data stream. After SONET Processing has been completed, TDM data is handed off to the VCAT block 218.

The VCAT block 218 processing is a bit more complicated on the receive side because the various STS-1 or STS-3c channels that comprise a VCAT channel may come through different paths in the network—causing varying delays between SONET channels. The H4 byte is processed by the VCAT block to determine:

STS-1 or STS-3c channel sequencing
Delays between SONET channels

This information is learned over the course of 16 SONET frames to determine how the VCAT block 218 should process the aggregate VCAT channel data. As data on each STS-1 or STS-3c is received, it is stored in VC Memory 224. Skews between each STS-1 or STS-3c are compensated for by their relative location in VC Memory 224 based on delay information supplied in the H4 information for each channel. The maximum skew between any two SONET channels is determined by the depth of the VC Memory 224. Bytes of data are spread one-by-one across each of the SONET channels that are members of a VCAT channel; so, if one SONET channel is lost, no data will be supplied through the aggregate VCAT channel.

The Decapsulation block 214 pulls data out of the VC Memory 224 based on sequencing information supplied to it by the VCAT block 218. Data is pulled a byte at a time from different address locations in VC Memory 224 corresponding to each received SONET channel that is a member of the VCAT channel. The Decapsulation block 214 is a Time Division Multiplex (TDM) block that is capable of supporting multiple instances of VCAT channels (up to 24 in the degenerate case of all STS-1 SONET channels) as well as multiple encapsulation types, simultaneously. Decapsulation of PPP in HDLC framing, X.86 and GFP (frame mode) are all supported. The Decapsulation block 214 strips all encapsulation overhead data from the received SONET data and provides raw Ethernet frames to the Rx MCS 210. If Ethernet FCS data was stripped by the transmit side Encap block 216 (option in PPP), then it is also added in the Decap block 214. Length information, used by GFP, will be stripped in this block.

Rx MCS 210 receives data from the Decapsulation block 214 The scheduling function required for populating Rx Memory 220 from the SONET side is straightforward. As the Decapsulation block 214 provides data to Rx MCS 210, it writes the corresponding data to memory 220 in the order that it was received. There is a clock domain transfer from the Decapsulation block 214 to Rx MCS 210; so, a small amount of internal buffering is provided for rate adaptation within the ELSA 204. Through provisioning information, Rx MCS 210 creates associations of VCAT channels to memory locations. Four memory partition locations are supported, one for each possible LAN port. Data in each memory partition is organized and controlled as a FIFO.

The algorithm for scheduling data from the Rx Memory 220 to corresponding LAN ports is essentially a token-based scheduling scheme. Ports/customers are given a relative number of tokens based on the bandwidth that they are allocated on the WAN side. So, an STS-3c channel is allocated three times as many tokens as an STS-1 channel. Tokens are refreshed for each port/customer on a regular basis. When the tokens reach a predetermined threshold, a port/customer is allowed to transfer data onto the appropriate LAN port. If the threshold is not reached, additional token replenishment is required before data can be sent. This algorithm takes into account the relative size of frames (byte counts) as well as the allocated WAN bandwidth for a particular port/customer. Each port/customer receives a fair share of LAN bandwidth proportional to the WAN bandwidth that was provisioned.

The scheduler function also takes into account the possibility of WAN oversubscription. Since it is possible to provision an STS-24 worth of bandwidth, care must be taken when mapping this amount of bandwidth onto a 1 Gbps LAN link; maintaining fairness of bandwidth allocation among ports/customers is key. The scheduler algorithm provides fair distribution of bandwidth under these conditions. In the case where WAN oversubscription is persistent, Rx Memory 220 will fill and eventually data will be discarded; however, it will be discarded fairly, based on the amount of memory that each port/customer was provisioned.

As with the Tx Memory 222, the Rx Memory 220 is partitioned in the same manner. Four partitions are created. Each port/customer will get an equal share of memory.

The GMII interface 208 provides the interface to the L2 switch 202 as described earlier for the Tx direction. In the Rx direction, the GMII interface 208 supplies PAUSE data as part of the data stream when the GMII has determined that watermarks were crossed in the Tx Memory 222.

The L2 Switch 202 operates the same in the Rx direction as in the Tx direction. It is completely symmetrical and uses port mirroring in this direction as well. It may receive PAUSE frames from the GMII I/F 208 in the ELSA 204, in which case, it will stop sending data to the ELSA 204. In turn, the L2 Switch 202 memory may fill (in the Tx direction) and eventually packets will be dropped, or the L2 Switch 202 will generate PAUSE to the attached router or switch. The L2 Switch 202 supplies the PHY 228 with GMII formatted data.

The PHY 228 converts the GMII information into appropriately coded information and performs a parallel to serial conversion and transfers the data out onto the respective LAN port.

Figure 3:
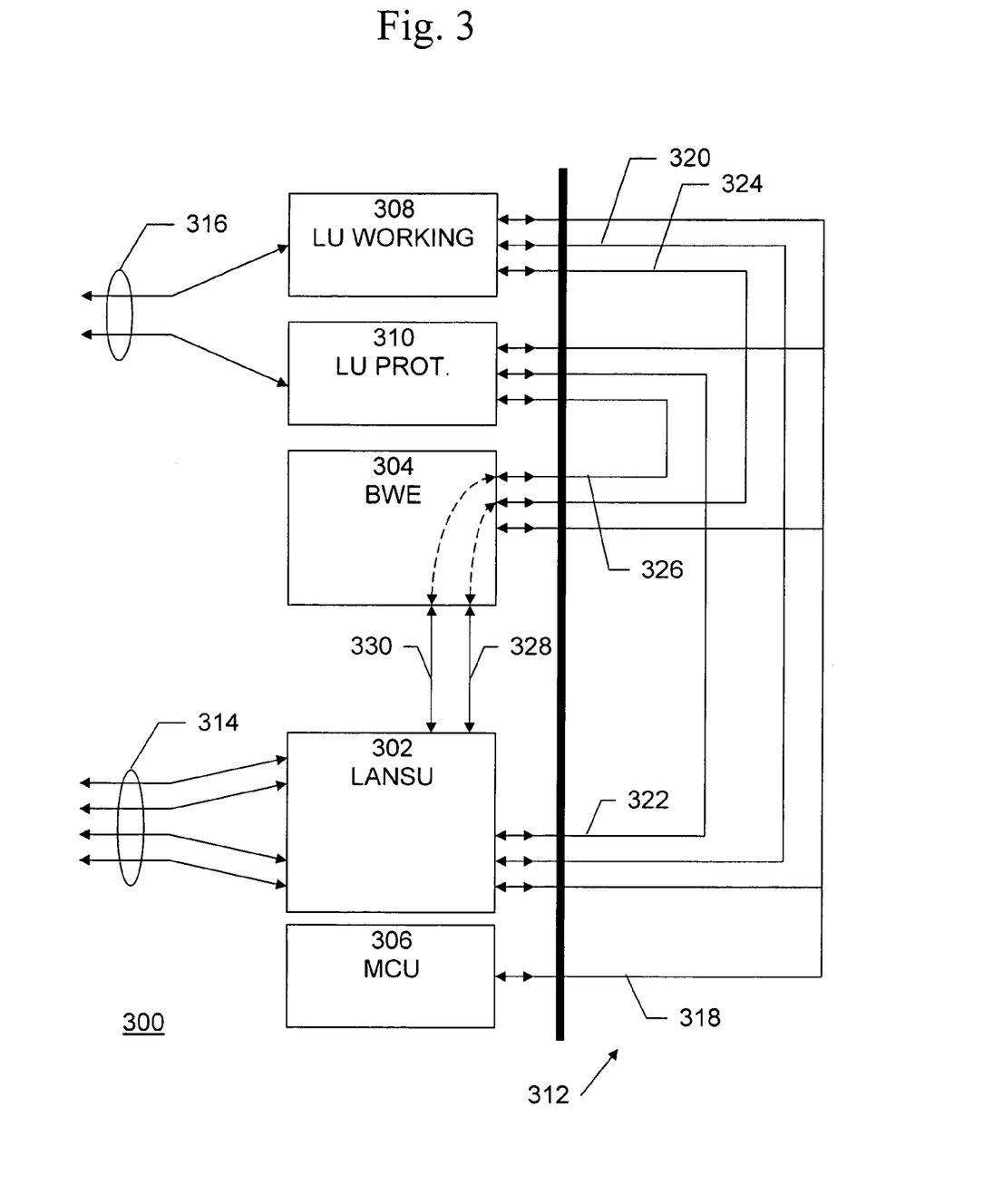
FIG. 3 is an exemplary block diagram of a system in which the bandwidth extender of the present invention may be implemented.

An exemplary block diagram of a system 300 in which the bandwidth extender of the present invention may be implemented is shown in FIG. 3. System 300 includes LANSU 302, Bandwidth Extender Card (BWE) 304, Management & Control Unit (MCU) 306, a plurality of Line Units (LUs), including LU Working 308 and LU Protection 310, and backplane 312. LANSU 302 provides the interface between the LAN or LANs connected to LAN ports 314 and the WAN, such as a SONET network, connected to the WAN ports 316 of the LUs 308 and 310. For example, LANSU 302 may provide four optical or electrical Ethernet ports 314 via the front panel and a 155/622 (STS-3/12) working SONET interface and a 155/622 (STS-3/12) protect SONET interface over backplane 312.

MCU 306 provides management functions to system 300, via interfacing with local craft ports, SONET Digital Control Channel (DCC), and/or others. The provided functions include, for example, downloading configuration settings, collection of SONET Performance Monitoring counts, alarms and outages, and controlling protection switching. Each LU, such as LUs 308 and 310, provides timing control to access precision network clock, provides SONET frame pulse reference, and can contain optical interfaces to transmit part of all of the SONET data on the SONET network. For example, the LUs may provide OC3/12/48 SONET service to a SONET network connected to WAN ports 316.

Backplane 312 provides the signal connectivity among the other parts of system 300 that allow the parts of the system to communicate. In particular, backplane 312 provides Management & Control connections 318 that allow MCU to control LANSU 302, BWE 304, and LUs 308 and 310. One example of a technology that may be used to provide Management & Control connections 318 is the Serial Hardbus.

Backplane 312 also provides data traffic communications connections 320, 322, 324, and 326 among LANSU 302, BWE 304, and LUs 308 and 310. Each LANSU, such as LANSU 302 may have interfaces that provide a 155/622 (STS-3/12) working SONET connection 320 and a 155/622 (STS-3/12) protect SONET connection 322 to LUs 308 and 310 via backplane 312. BWE 304 is inserted in a LANSU backplane slot and provides a second 155/622 (STS-3/12) working SONET connection 324 and a second 155/622 (STS-3/12) protect SONET connection 326 to LUs 308 and 310 via backplane 312.

LANSU 302 has LAN interfaces 314 that provide greater total bandwidth than the single set of SONET working/protect interfaces can handle. Thus, LANSU also provides BWE interfaces 328 and 330, which provide a second set of SONET working/protect interfaces to BWE 304. In particular, BWE interface 328 provides a second 155/622 (STS-3/12) working SONET interface from LANSU 302 to BWE 304 and BWE interface 330 provides a second 155/622 (STS-3/12) protect SONET interface from LANSU 302 to BWE 304. BWE 304 connects BWE interface 328 to a second 155/622 (STS-3/12) working SONET connection 324 to LU 308 via backplane 312 and connects BWE interface 330 to a second 155/622 (STS-3/12) protect SONET connection 326 to LU 310 via backplane 312.

Thus, the data traffic communicated over LAN interfaces 314 are communicated to LUs 308 and 310 over two backplane SONET connections each, which provides double the bandwidth of a single backplane SONET connection each. The data traffic is routed using virtual concatenation (VCAT), which divides the data traffic into two data streams, each of which is sent over a different one of the two backplane SONET connections. For example, data traffic received on LAN interface 314 is split into two data streams, one of which is transmitted over backplane SONET connections 320 and 322 and the other of which is transmitted via BWE interfaces 328 and 330 over backplane SONET connections 324 and 326. The two data streams are merged into a single SONET data stream, for transmission over the SONET network connected to SONET interface 316. The two data streams are reassembled into the original data traffic at the destination of the SONET network, using VCAT.

Likewise, data received over SONET interface 316 at LUs 308 and 310 is a single SONET data stream containing two VCAT data streams. LUs 308 and 310 divide the single SONET data stream into the two VCAT data streams and transmit them to LANSU 302 over the two backplane SONET connections. For example, data traffic received on WAN interface 316 is split into two data streams, one of which is transmitted over backplane SONET connections 320 and 322 to LANSU 302 and the other of which is transmitted over backplane SONET connections 324 and 326 to BWE 304 and from there to LANSU 302 over BWE interfaces 328 and 330. The two data streams are reassembled into the original data traffic at LANSU 302, using VCAT, and transmitted over LAN interface 314.

Virtual concatenation (VCAT) is a standard procedure for splitting data into multiple data streams and recombining the data streams to form the original data. VCAT breaks the integral payload into individual SONET Payload Envelopes (SPEs), separately transports each SPE and then recombines them into a contiguous bandwidth at the end point of the transmission. This type of concatenation requires concatenation functionality only at the path termination equipment.

One example of virtual concatenation involves the virtual concatenation of X STS-1/STS-3c SPEs (STS-1/3c-Xv SPE, X=1 . . . 256). For the transport of payloads that do not fit efficiently into the standard set of synchronous payload envelopes (STS-1 and STS-Nc SPEs) virtual concatenation can be used.

An STS-1/3c-Xv SPE provides a contiguous payload area of X STS-1/3c SPE with a payload capacity of X*48960/148608 kbit/s. The payload capacity is mapped into X individual STS-1/3c SPEs which form the STS-1/3c-Xv SPE. Each STS-1/3c SPE has its own POH as specified in 8.2.3. The H4 POH byte is used for the virtual concatenation specific sequence and multi-frame indication as defined below.

Each STS-1/3c SPE of the STS-1/3c-Xv SPE is transported individually through the network. Due to different propagation delay of the STS-1/3c SPEs a differential delay will occur between the individual STS-1/3c SPEs. This differential delay has to be compensated and the individual STS-1/3c SPEs have to be realigned for access to the contiguous payload area. The realignment process has to cover at least a differential delay of 125 µs.

The sequence indicator SQ identifies the sequence/order in which the individual STS-1/3c SPEs of the STS-1/3c-Xv SPE are combined to form the contiguous STS-1/3c-Xc SPE payloads. Each STS-1/3c SPE of a STS-1/3c-Xv SPE has a fixed unique sequence number in the range of 0 to (X-1). The STS-1/3c SPE transporting the first time slot of the STS-1/3c-Xc SPE has the sequence number 0, the STS-1/3c SPE transporting the second time slot the sequence number 1 and so on up to the STS-1/3c SPE transporting time slot X of the STS-1/3c-Xc SPE with the sequence number (X-1). The sequence number is fixed assigned and not configurable. It allows the service provider to check the correct constitution of the STS-1/3c-Xv SPE without using the trace. The 8-bit sequence number (which supports values of X up to 256) is transported in bits 1 to 4 of the H4 bytes, using frame 14 (SQ bits 1-4) and 15 (SQ bits 5-8) of the first multi-frame stage.

Another example of virtual concatenation involves the virtual concatenation of X VTn SPEs (n=1.5, 2, 3, 6). For the transport of payloads that do not fit efficiently into the standard set of synchronous payload envelopes (VT1.5/2/3/6 SPEs) virtual concatenation can be used.

A VTn-Xv SPE provides a payload area of X VTn SPE payload capacity. The payload is mapped in X individual VTn SPEs which form the VTn-Xv SPE. Each VTn SPE has its own POH.

Each VTn SPE of the VTn-Xv SPE is transported individually through the network. Due to this individual transport a differential delay will occur between the individual VTn SPEs and therefore the order and the alignment of the VTn SPEs will change. At the termination the individual VTn SPEs have to be rearranged and realigned in order to re-establish the contiguous concatenated container. The realignment process has to cover at least a differential delay of 125 µs.

To perform the realignment of the individual VTn SPEs (n=1.5, 2, 3, 6) that belong to a virtually concatenated group it is necessary to:

a) Compensate for the differential delay experienced by the individual VTn SPEs b) To know the individual sequence numbers of the individual VTn SPEs.

Bit 2 of the Z7 byte of the Low Order VTn POH is used to convey this information from the sending end to the receiving end of the virtually concatenated signal where the realignment process is performed. A serial string of 32 bits is arranged over 32 four-frame multiframes. This string is repeated every 16 ms (32 bits×500 µs/bit) or every 128 frames.

The LO virtual concatenation information in Z7 bit 2 has a 32 bits multiframe. The phase of the LO virtual concatenation information in Z7 bit 2 should be the same as for the Z7 bit 1 extended signal label.

Virtually concatenated VTn SPEs must use the extended signal label. Otherwise the frame phase of the Z7 bit 2 multiframe can not be established.

The frame consists of the following fields: The LO virtual concatenation frame count is contained in bits 1 to 5. The LO virtual concatenation sequence indicator is contained in bits 6 to 11. The remaining 21 bits are reserved for future standardization, should be set to all "0"s and should be ignored by the receiver.

The LO virtual concatenation frame count provides a measure of the differential delay up to 512 ms in 32 steps of 16 ms that is the length of the multiframe (32×16 ms=512 ms).

The LO virtual concatenation sequence indicator identifies the sequence/order in which the individual VTn SPEs of the VTn-Xv SPE are combined to form the contiguous VTn-Xc SPE payload capacity. Each VTn SPE of a VTn-Xv SPE has a fixed unique sequence number in the range of 0 to (X-1). The VTn SPE transporting the first time slot of the VTn-Xc SPE has the sequence number 0, the VTn SPE transporting the second time slot the sequence number 1 and so on up to the VTn SPE transporting time slot X of the VTn-Xc SPE with the sequence number (X-1). For applications requiring fixed bandwidth the sequence number is fixed and not configurable. This allows the constitution of the VTn-Xv SPE to be checked without using the trace.

Although specific embodiments of the present invention have been described, it will be understood by those of skill in the art that there are other embodiments that are equivalent to the described embodiments. For example, the present invention contemplates that the data traffic may be encapsulated using an encapsulation mode selected from a group of encapsulation modes comprising Point-to-Point Protocol (PPP), X86, Frame Mapped Generic Framing Procedure (GFP-F), Transparent Generic Framing Procedure (GFP-T), Asynchronous Transfer Mode (ATM), Resilient Packet Ring (RPR), Ethernet, and Multiprotocol Label Switching (MPLS). As another example, the LAN interface of the LAN Service Unit may support an interface type selected from a group of interface types comprising 100 BaseT Ethernet, 1000 BaseT Ethernet, Fiber channel, Fiber Connection/Connectivity (FICON), and Enterprise Systems Connection/Connectivity (ESCON). As another example, the WAN interface of the Line Unit supports an interface type selected from a group of interface types comprising Synchronous Optical Network (SONET), Synchronous Digital Hierarchy (SDH), Ethernet, and Resilient Packet Ring (RPR). As another example, the backplane data traffic communications connection may be implemented using one of Low-Voltage Differential Signaling (LVDS), Low Voltage Positive Emitter Coupled Logic (LVPECL), or Current-Mode Logic (CML).

Accordingly, it is to be understood that the invention is not to be limited by the specific illustrated embodiments, but only by the scope of the appended claims.

What is claimed is:

1. A system having increased LAN service unit bandwidth comprising:

a backplane including a plurality of data traffic communications connections operable to communicate data traffic;

a line unit including a WAN interface and a first data traffic communications interface to the data traffic communications connections of the backplane, the line unit operable to communicate data traffic between the WAN interface and the first data traffic communications interface;

a LAN service unit not included in the line unit and including a LAN interface, a data traffic communications interface to a bandwidth extender, and a second data traffic communications interface to the data traffic communications connections of the backplane, the LAN service unit operable to communicate a first portion of data traffic destined for or originating from the line unit between the LAN interface and the data traffic communications interface to the bandwidth extender and to communicate a second portion of data traffic destined for or originating from the line unit between the LAN interface and the second data traffic communications interface to the data traffic communications connections of the backplane; and the bandwidth extender not included in the line unit or the LAN service unit and including a data traffic communications interface to the LAN service unit and a third data traffic communications interface to the data traffic communications connections of the backplane, the bandwidth extender operable to communicate the first portion of data traffic destined for or originating from the line unit between the data traffic communications interface to the LAN service unit and the third data traffic communications interface to the data traffic communications connections of the backplane.

2. The system of claim 1; wherein the LAN service unit is further operable to receive data on the LAN interface, split the received data into two data streams, and transmit the data over the data traffic communications interface to the bandwidth extender and the second data traffic communications interface to the data traffic communications connections.

3. The system of claim 2, wherein the LAN service unit is further operable to receive data in two data streams, one data stream received over the data traffic communications interface to the bandwidth extender and one data stream received over the second data traffic communications interface to the data traffic communications connections, to reassemble the two received data streams into traffic data, and to transmit the reassembled traffic data over the LAN interface.

4. The system of claim 3, wherein the LAN service unit is further operable to split the data received over the LAN interface into multiple data streams using virtual concatenation or link aggregation, and wherein the LAN service unit is further operable to reassemble the multiple data streams received over the data traffic communications interface to the bandwidth extender and over the second data traffic communications interface to the data traffic communications connections using Virtual Concatenation or Link Aggregation.

5. The system of claim 4, wherein the LAN interface supports Ethernet.

6. The system of claim 5, wherein the WAN interface supports Synchronous Optical Network or Synchronous Digital Hierarchy.

* * * * *